March 31, 1970   J. R. MECREDY   3,503,322

STEAM COOKER DEVICE

Filed Feb. 14, 1967   4 Sheets-Sheet 1

INVENTOR.
JAMES R. MECREDY
BY
Teare, Teare & Sammon
ATTORNEYS

March 31, 1970     J. R. MECREDY     3,503,322

STEAM COOKER DEVICE

Filed Feb. 14, 1967     4 Sheets-Sheet 3

INVENTOR.
JAMES R. MECREDY
BY Teare, Teare & Sammon
ATTORNEYS

March 31, 1970   J. R. MECREDY   3,503,322
STEAM COOKER DEVICE
Filed Feb. 14, 1967   4 Sheets-Sheet 4
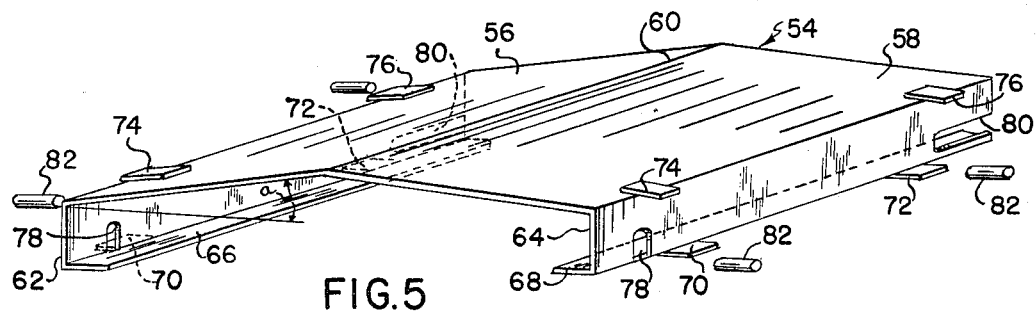
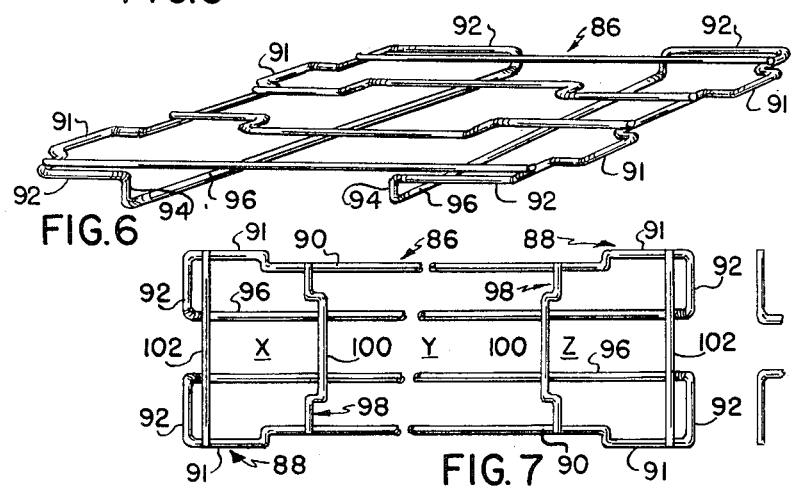
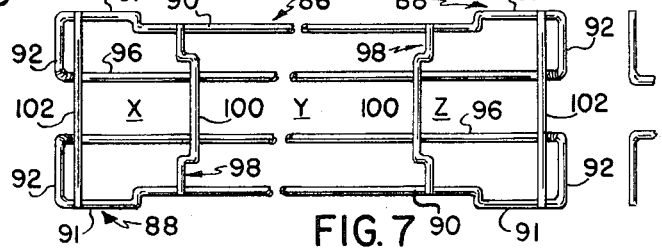
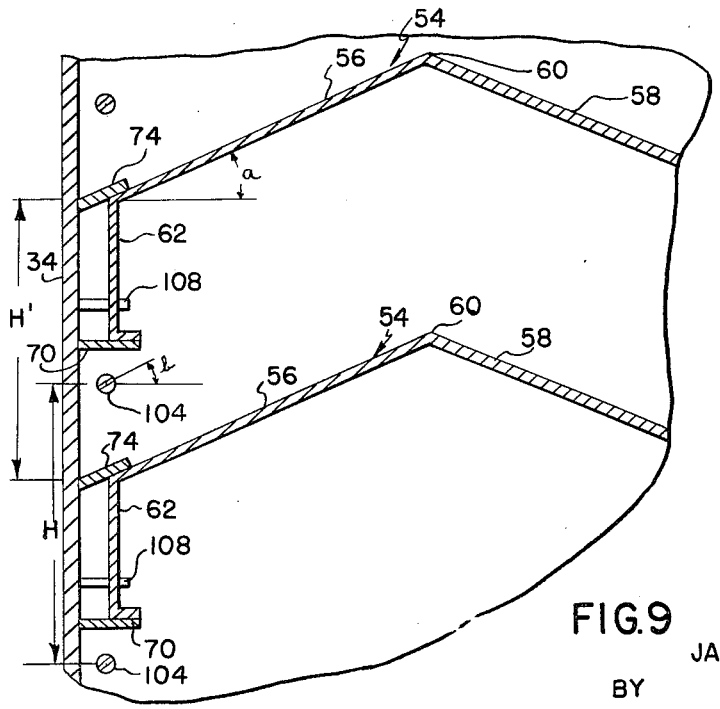
INVENTOR
JAMES R. MECREDY
BY
Teare, Teare & Sammon
ATTORNEYS United States Patent Office 3,503,322
Patented Mar. 31, 1970

1

3,503,322
STEAM COOKER DEVICE
James R. Mecredy, Lakewood, Ohio, assignor to The Cleveland Range Company, Cleveland, Ohio, a corporation of Ohio
Filed Feb. 14, 1967, Ser. No. 616,001
Int. Cl. A23l 1/00
U.S. Cl. 99—324                                    14 Claims

ABSTRACT OF THE DISCLOSURE

A steam cooker for heating and/or cooking food items including a plurality of superposed rows of compartments. Each compartment having a series of superposed baffle members dividing each compartment into a plurality of separate heating and/or cooking chambers. Each chamber having a removable support rack for supporting one or more food containers in laterally spaced relationship for movement into and out of the chamber. A heat system disposed in each of the chambers including at least one pair of oppositely disposed apertured steam lines located immediately below and adjacent the opposed ends of the respective support racks for impinging steam upwardly and directly onto the containers for heating and/or cooking food items contained therein.

BACKGROUND OF THE INVENTION

The present invention relates to cooking apparatus, and more particularly relates to a steam cooker device for heating and/or cooking food items and/or for maintaining a substantially uniform heat content in the cooked foods. The device may be effectively employed for reconstituting, such as by thawing or the like, food items which have been previously frozen or semi-frozen so as to reconstitute the same into a palatable condition or state. The device may be employed in an advantageous manner for treating any original and/or pre-cooked food items.

Heretofore, various types of methods and/or apparatus, such as steam cookers, have been employed for treating food items. Such methods, however, are costly to produce and operate, require the use of auxiliary heating equipment, are bulky and space consuming in construction, are not readily controllable, and are not entirely efficient for treating food items, particularly those which are in a frozen or semi-frozen condition. One such method has employed the use of a single steam line disposed at the top of the cabinet for directing steam downwardly on the food items to be treated. This method, however, is not entirely satisfactory in efficiently cooking and/or heating food items, and particularly for maintaining a uniform heat content in the food items especially where a multiplicity of heating compartments and/or chambers are employed. Such prior method is disclosed in the U.S. patent to Churley 3,071,473. In still another method, a single pipe has been employed for impinging water onto the bottom wall of the cabinet which bottom wall incorporates a heating element for vaporizing the water into steam which is then subsequently deflected upwardly onto the food items, as described in the U.S. patent to Chase 3,077,530. Here again, such method is not entirely satisfactory for treating the food items, particularly where a multiplicity of compartments and/or chambers are employed for treating large quantities of food items and where the necessity to maintain a constant, uniform heat content in the food items is esssential. Furthermore, such prior methods are not entirely efficient in providing a maximum turbulent flow of steam around the food items to be treated where a multiple compartmentalized heating cabinet is employed.

In addition, such heretofore known methods have not provided a satisfactory arrangement for preventing the condensate formed during the heating operation from dripping onto the next lower of the food items to be treated and for maintaining a sufficient volumetric area above and below the food items to be treated to insure a uniform, turbulent flow of steam around the food items to be treated. Furthermore, such heretofore known arrangements have not provided an adequate arrangement for supporting the containers which hold the food items to be treated so as to insure a maximum exposure thereof to the steam flow and to prevent the lateral shifting movement and/or accidental displacement of the food holding containers during the heating operation.

SUMMARY OF THE INVENTION

The steam cooker device of the present invention comprises a frame or cabinet having a lower section and an upper section. The lower section provides a housing for the controls, steam generating components and other parts of the device. The upper or heating section comprises a plurality of laterally spaced rows of superposed heating compartments. Each such compartment is divided into a series of superposed heating chambers by means of baffle members having a novel dome-shaped construction. A novel supporting member, such as a rack, is adapted to be slidably disposed in each of the respective chambers for mounting containers which hold the food items to be treated. The baffle members act to provide a sufficient volumetric area above and below the respective containers to insure maximum turbulent steam flow in and around the containers and to effectively direct the condensate formed downwardly and angularly outwardly toward the side walls of the cabinet for discharge from the bottom thereof. The support members are each made of a wire mesh-like construction which act to mount the containers so as to give maximum exposure of the respective food items to the steam flow and to prevent lateral shifting movement and/or accidental dislodgment of the containers during the food treating operation. Each chamber includes a steam heating system which preferably includes at least one pair of oppositely disposed apertured steam lines which are disposed immediately below and adjacent the opposed ends of the respective support members. The apertures in the lines are disposed so as to direct the steam flow upwardly into direct contact with the under surface of the containers. Preferably, the apertures in the respective lines are angularly oriented so as to direct the steam flow upwardly in an angular direction and into contact with the containers, thereby to provide a turbulent steam flow in and around the containers in each of the respective chambers. The steam lines are preferably each provided with removable closure members which enable the lines to be cleaned and maintained without removal from the chambers.

BRIEF DESCRIPTION OF THE DRAWINGS

FIG. 5 is a generally perspective view showing the novel baffle plate construction made in accordance with the invention;

FIG. 6 is a perspective view of the novel support rack made in accordance with the invention;

FIG. 7 is a top plan view of the support rack shown in FIG. 6;

FIG. 9 is a fragmentary view, partly in section, showing the arrangement of the baffle and steam system made in accordance with the invention.

DESCRIPTION OF THE PREFERRED EMBODIMENTS

Figure 1:
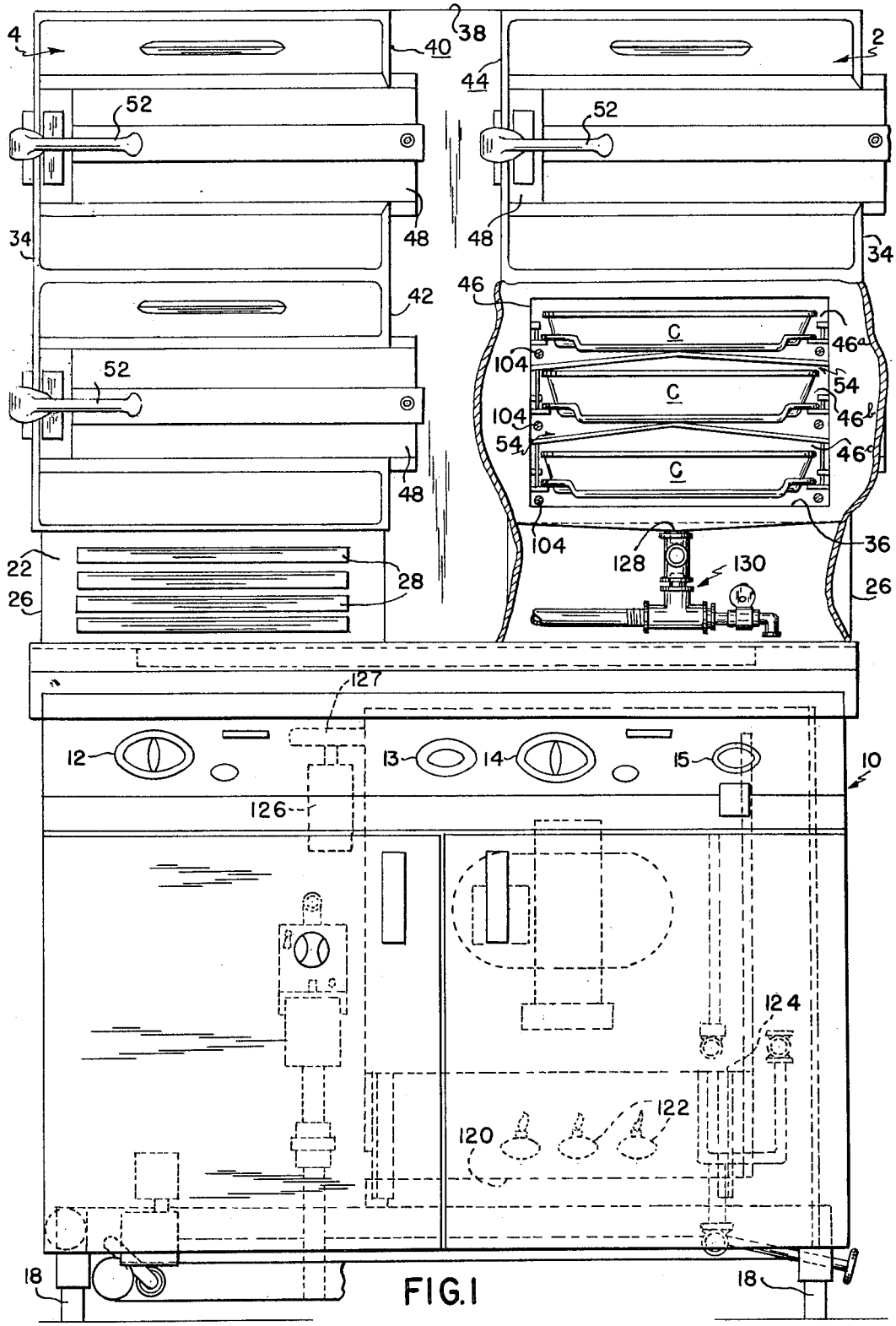
FIG. 1 is a front elevation view, partly broken away, showing the steam cooker device made in accordance with the invention.
Figure 2:
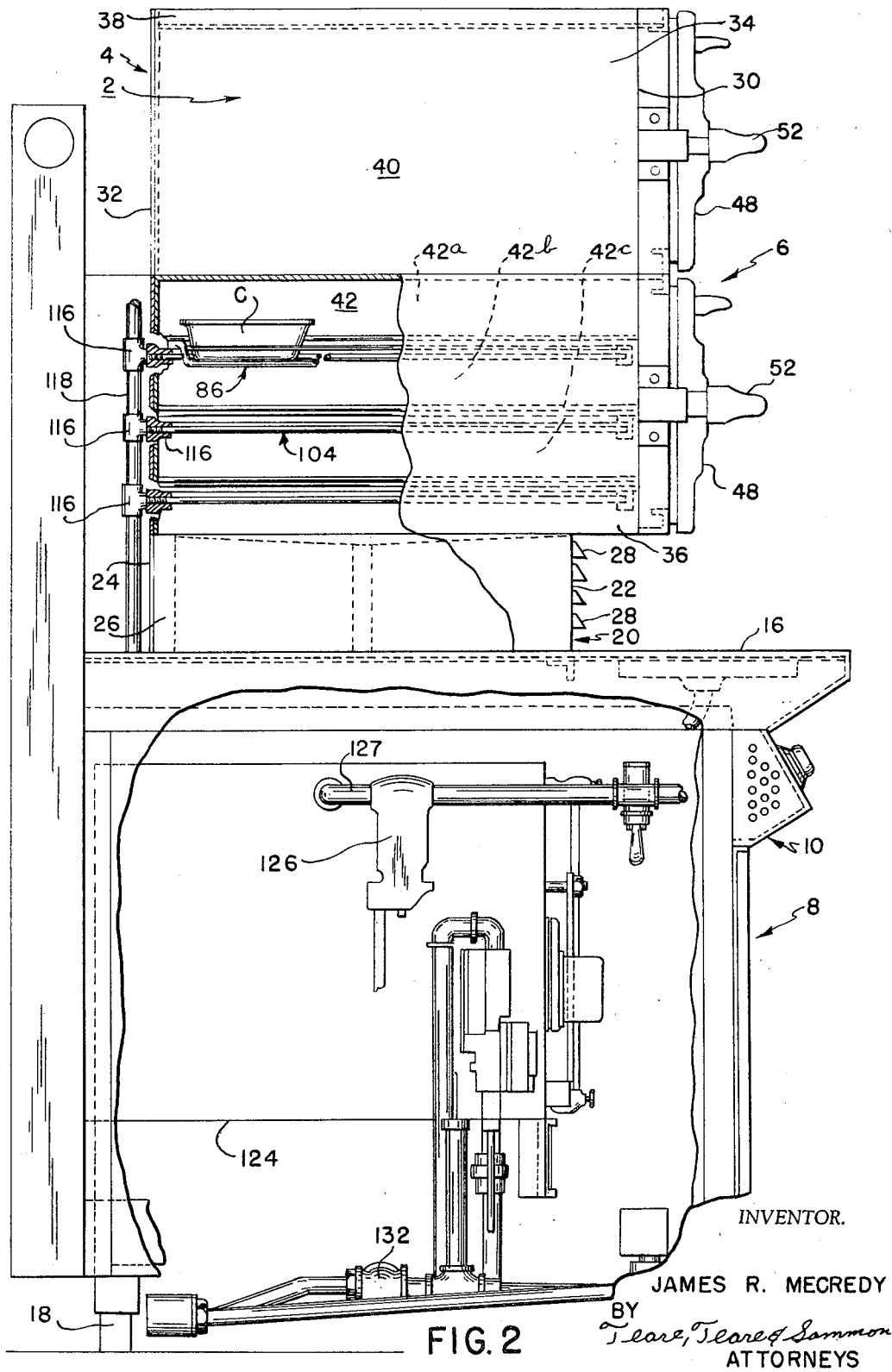
FIG. 2 is a fragmentary side elevation view, partly in section and partly broken away, of the steam cooker device of FIG. 1.

Referring again to the drawings, and in particular to FIGS. 1 and 2 thereof, there is shown a cooker device, designated generally at 2, which comprises a frame or cabinet 4 which may be made of any suitable material, such as aluminum, steel or the like. As shown, the cabinet generally includes a base of lower section 8 which provides a housing for the heat generating system for the cabinet and an upper or heating section 6. In this connection, the lower section 8 is provided with a horizontally disposed control panel 10 with various control dials, as at 12–15, for actuating the unit. The lower section 8 also includes an upper deck or counter portion 16 which provides an area for readily storing containers or the like thereon. The lower section 8 may be mounted on a series of legs 18 which may be adjustable for varying the vertical heighth of the device and for leveling the same, as desired.

An intermediate section 20 of reduced width and heighth (FIG. 2) may be disposed between the upper section 6 and the lower section 8 for connecting the same together in superposed relation. This intermediate section is preferably of a polygonal shape, in transverse cross section, defined by oppositely disposed front 22 and back walls 24 and a pair of oppositely disposed side walls 26. The front wall 22 of the intermediate section 20 may be provided with a series of vertically spaced louvers 28 for venting high temperature air and the like through and from the device. This intermediate section also acts as a storage for certain of the auxiliary equipment, such as the condenser and the like, as will hereinafter be more fully described.

Figure 3:
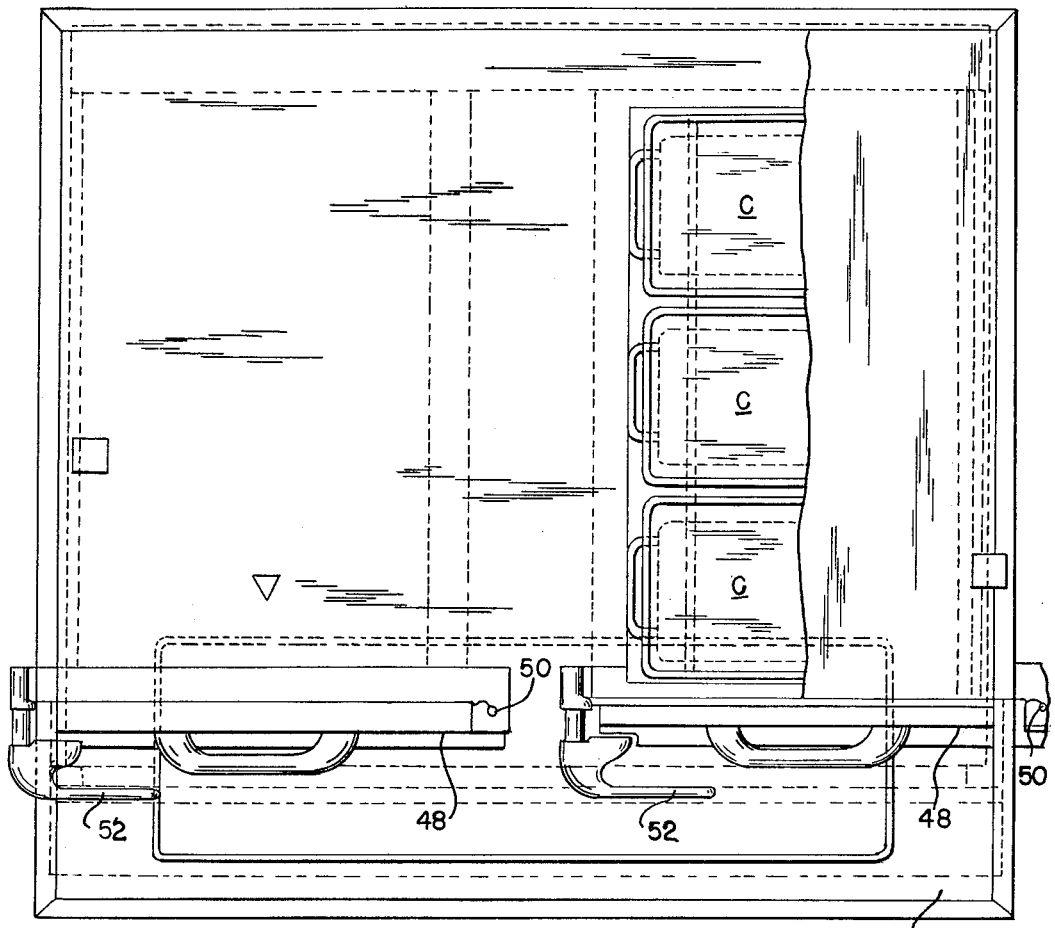
FIG. 3 is a top plan view, partly broken away, of the steam cooker device of FIG. 1.

The upper section 6 of the device is of a reduced transverse depth (FIG. 2) as compared to the lower section 8 and is defined by oppositely disposed front 30 and back walls 32, a pair of oppositely disposed side walls 34, a bottom 36 and a top wall 38 to provide the configuration shown. The front wall 30 of the upper section includes a plurality, such as four openings, which provide compartments 40, 42, 44 and 46. Each compartment is provided with a door 48 which is hinged, as at 50 (FIG. 3) to provide a hermetic seal for the respective opening. The doors may be provided with suitable lock-type handles 52 for opening and closing the same. As best seen in FIGS. 1 and 2, each compartment, such as 40, 42, 44 and 46, is divided into a series of chambers by a plurality of superposed baffle members 54. For example, as shown, compartment 42 may have two (2) baffle members 54 to provide three (3) chambers, such as 42a, 42b and 42c; while compartment 46 has similar baffle members 54 and chambers 46a, 46b and 46c. The compartments and chambers are generally of identical construction so that like reference numerals are employed with the letter suffix "a," "b," etc. added to designate like parts.

Figure 4:
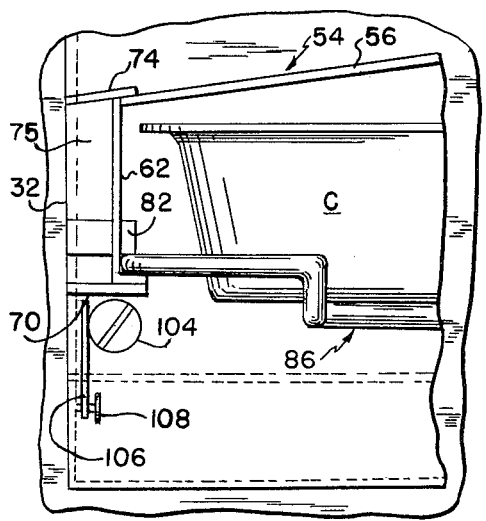
FIG. 4 is an enlarged fragmentary view showing a portion of the novel support rack and baffle member construction made in accordance with the invention.
Figure 8:
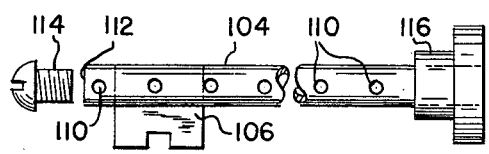
FIG. 8 is an elevation view of one of the steam pipes and removal from the device.

In the form shown, the respective baffle members 54 are preferably of an identical construction so that the following description will proceed with reference to one thereof. As best seen in FIGS. 4 and 5, each baffle member 54 is of a generally dome-shaped configuration, in elevation, made from a metallic material, such as aluminum, steel or the like. Each baffle member 54 comprises a top which includes a pair of generally planar, inclined portions 56 and 58 which extend divergently downwardly from one another from an apex 60. The planar portions 56 and 58 are of equal length and are inclined at an angle (a), such as about 10° to 15°, to provide adequate drainage of the condensate which forms on both sides thereof. Each planar portion is provided at its terminal side edge with a vertically downwardly extending side walls 62 and 64. Horizontally extending flanges 66 and 68 are integrally attached at the bottom of each of the respective side walls 62 and 64 so as to extend inwardly to provide a support means, as will be hereinafter described.

As shown, each of the side walls 62 and 64 is provided with a pair of laterally spaced, oppositely disposed tongues 70 and 72 which may be attached thereto, such as by weldments, and extend horizontally outwardly therefrom so as to bear against the confronting side walls of the chamber. Also, a pair of laterally spaced, oppositely disposed tabs 74 and 76 may be attached to the planar portions 56 and 58, such as by weldments, and may project downwardly in the same direction thereof so as to bear against the confronting side walls of the chamber. By this arrangement, the tongues and tabs act as an abutment and spacing means for the respective baffle member within the chamber. Moreover, a space 75 (FIG. 4), such as about ¼-inch, may be provided between the side walls 62 and 64 of the baffle member and the confronting interior surface of the chamber side walls 32 to provide a passageway for the removal of the condensate therefrom, and between the tongues and tabs. Accordingly, the condensate from the steam flow is enabled to collect on both sides of the planar portions 56 and 58 so as to be diverted downwardly, and hence, vertically downwardly into the next lower chamber for ultimate discharge at the bottom of the respective compartment.

To detachably mount each of the baffle members 54 within the compartments to provide the respective chamber, each of the side walls 62 and 64 may be provided with a generally vertically oriented slot 78 which opens onto the marginal side edge thereof, and a horizontally extending slot 80 which opens onto the marginal end edge thereof. The slots 78 and 80 are adapted to receive therein a corresponding number of studs, as at 82, which may be attached to the side walls of the respective chambers, as seen in FIG. 4. By this arrangement, the baffle members 54 can be readily removed by lifting the front slots 78 from the respective studs 82 and then by disengaging the rear slots 80 from their respective studs. In this regard, it is to be noted that any number of the baffle members, such as 54, may be mounted in the compartments to provide any number of chambers, as desired.

As best seen in FIGS. 6 and 7, a novel support means in the form of a wire mesh-type rack 86 is removably disposed in each of the chambers between the baffle members 54 for supporting containers C which hold food items therein. In accordance with the invention, the racks 86 are constructed and arranged for supporting two or more containers thereon. The support rack, in the form shown, includes, in top plan, a pair of oppositely disposed side elements 88 which are bent in to provide generally U-shaped recessed portions 90. The side elements 88 are provided adjacent their ends with other oppositely disposed generally U-shaped portions 91 which provide extensions for sliding engagement on the flanges 66 and 68 of the respective baffle members 54. The side elements 88 are bent at right angles adjacent their ends to provide end elements 92 which are disposed in the same common plane thereof and which are bent vertically downwardly at their ends to provide leg elements 94.

A pair of laterally spaced longitudinally extending elements 96 are made integral with and extend between the leg elements 94 and are disposed in a common plane below the side elements 88. A pair of laterally spaced, oppositely disposed spacer elements 98 extend transversely between the side elements 88 and have generally U-shaped recessed portions 100 disposed inwardly toward one another. The spacer elements 98 are disposed in the same common plane with the side elements 88. A pair of transverse end elements 102 also extend between the side elements 88 in the same plane therewith and adjacent the end elements 92. By this arrangement, a series of retainer areas, such as X, Y and Z, are provided for supporting a container therein. Thus the containers are held against movement between respective side elements 88, spacer elements 98 and the transverse end elements 102. Moreover, the generally U-shaped portions 90 and 100 of the respective side elements 88 and spacer elements 98 provide an abutment for limiting shifting movement of the containers and also provide a spacing between the containers for enabling steam flow to pass therethrough, thereby to expose the containers for a maximum heat transfer to the food items to be cooked. When supported on the rack, the bottom surface of the containers are adapted to rest on the longitudinally extending elements 96 which are disposed in a common plane below the plane of the side elements 88 so that the containers are "nested" in the respective retainer areas, such as X, Y and Z, as seen in FIG. 7. By this arrangement, any number of food containers can be readily mounted and held against shifting movement on the respective support rack and exposed to a maximum amount of steam flow within the respective chamber due to the open net-work type construction of the rack.

Now in accordance with the invention and as best seen in FIGS. 1, 4, 8 and 9, a steam system is disposed within each of the respective chambers. As shown, each steam system preferably includes a pair of oppositely disposed, parallel, steam pipes 104 which extend horizontally from the front to the rear of the chamber along the side walls thereof. The respective pipes 104 in each chamber are connected to the side walls by means of brackets 106 (FIG. 8) and suitable fasteners 108, such as rivets or the like. Each of the pipes is provided with a series of laterally spaced apertures, as at 110, for emitting steam under pressure therefrom. Preferably, the axes of the respective apertures 110 are disposed at a predetermined angle with respect to a horizontal plane which passes through the longitudinal central axis of the pipe. Preferably, this angle (b) is about 10° to 15° (FIG. 9) so as to correspond to the angle of inclination (a) of the confronting surface of the planar portion 56 of the baffle members 54. By this arrangement, the steam may be directly impinged on the confronting under surface of a container C so that the vertical and horizontal components of the steam flow can be circulated efficiently around the containers so as to provide a turbulent uniform flow of steam within the respective chambers. It is to be understood, however, that the apertures may be disposed at other angles, such as at right angles with respect to the side walls of the chamber. It has been found, however, that improved results are achieved in obtaining a maximum heat transfer to the containers when the apertures are disposed as aforementioned.

The steam pipes 104 are preferably made of a good corrosion-resistant and heat conductive material, such as copper or the like. As shown, each of the respective pipes may be internally threaded at one end, as at 112, so to threadably receive therein (FIG. 8) a threaded plug 114. This arrangement enables the steam line to be readily cleaned and maintained without removal from the chamber. The other end of the pipe may be provided with a coupling 116 for connecting the same to a supply source, as will be hereinafter described.

As best seen in FIG. 9, each of the respective pipes 104 in each chamber is preferably disposed intermediate the confronting surface of the planar portion 56 of the associated baffle member 54 and the confronting surface of the flange 70 attached to the next adjacent baffle member. Preferably, each pipe is in substantially vertical alignment with and between the adjacent side walls 62 of the respective baffle members. In the embodiment shown, the pipes in each chamber are preferably disposed in vertical alignment with one another so that the distance H between the longitudinal central axis between each pair of pipes is approximately equal to the distance H' between the planar portions 56 along this vertical line or in a ratio of approximately 1:1. Also, it is preferred that the longitudinal central axis of each pipe lie in a horizontal plane passing through the apex 60 defined by the inclined planar portions 56 and 58 of the respective baffle member 54. By this structural arrangement and disposition of the parts, a maximum turbulent flow of the steam around the containers is achieved.

As best seen in FIG. 2, a common supply pipe 118 is operably connected in fluid transfer relation by means of the couplings 116 to each of the vertically spaced rows of pipes 104 in each of the chambers. In other words, though only one such common supply pipe is shown, it will be understood that one such pipe is provided so as to deliver steam under pressure to each of the four (4) vertically spaced rows of steam pipes shown. It is to be understood, however, that a common supply pipe, such as one of those shown, could be operably connected to each of the respective compartments and provided with suitable controls, such as solenoids, timers and the like, for separately regulating the steam delivered to each of the respective compartments via the pipes or steam provided therein.

In the embodiment shown, fluid or steam under pressure is delivered to the steam pipes 104 via the common supply lines 118 from a steam generating system located in the base or lower section 8 of the device. As shown in FIG. 1, this system may comprise a combustion chamber 120 which is heated by suitable heating elements 122, such as heating burners or the like, as known in the art. The combustion chamber 120 may be gas or the like, as desired. A boiler 124 is mounted above the combustion chamber 120 for generating steam under pressure therein. The steam generated within the boiler 125 may be transmitted to a suitable condensate and impurity removal device 126 (FIG. 2) and then via pipe 127 through suitable time control valves (not shown) to the common supply pipes 116. Preferably, the pressure developed in the boiler may be maintained at any value up to about 15 p.s.i. In this connection, it is to be understood that in place of such steam generating arrangement other suitable pressure regulating devices may be employed for supplying steam from an external source (not shown), as known in the art.

In accordance with the invention, the water of condensation is directed downwardly from the respective chambers into the lower section 8 of the device. More specifically, the condensate is directed downwardly and outwardly from the respective chambers by means of the inclined portions 56 and 58 of the respective baffle members 54 and downwardly into an outlet 128 opening in the bottom wall 36 of the lowermost of the respective chambers, as seen in FIG. 1. From the outlet the condensate is directed into a condenser 130, as shown in FIG. 1, which may be automatically and/or thermostatically controlled, as desired. From the condenser 130, the condensate is directed to a common drain line 132 (FIG. 2) from which it is then delivered to the exterior of the device. By this arrangement, the water of condensation is effectively collected by the exposed surfaces of the respective baffle members so as to be drained downwardly through the device and out of contact with the food items to be treated, thereby preventing any contamination thereof by the condensate.

In a specific example, a frozen processed food, such as chicken almandine, was reconstituted to a palatable condition by the cooker and method of the present invention. In accordance with such example aluminum containers C, each holding about 2½ pounds of the frozen food and covered with foil, was placed in the heating section 6. Three (3) containers were placed on each rack 86 in spaces X, Y, and Z (FIG. 7) with three (3) racks 86 in each compartment, such as 40, 42, 44 and 46, so that about 22½ pounds of food was in each compartment. The compartments were initially at atmospheric pressure of approximately 14.9 p.s.i. and ambient temperature. The doors 48 were then closed and pressure sealed. Steam under pressure was then introduced into respective pipes 104. The pressure in the pipes was in the range between about 3 p.s.i. to 5 p.s.i. and the temperature of the steam was between about 220° F. to 225° F. Steam under pressure was emitted from the apertures 110 at a rate of approximately 1 pound per inch per minute so as to raise the temperature in each compartment to approximately 205° F. to 212° F. without substantial increase in the pressure therein.

This temperature was maintained for approximately 30 minutes. Preferably, the temperature may be maintained in a range between about 20 minutes to 40 minutes dependent on the amount and type of food items to be treated. The doors 48 were then opened and the food containing container C removed after this time interval. The food items removed had a temperature suitable for ready consumption. Preferably, this temperature was in the range between about 130° F. to 150° F.

By this method, it was found that the food items treated were in a highly palatable condition ready for direct consumption by the user. The food items were thoroughly reconstituted without any noticeable reduction in taste or flavor. In addition, it was found that the method reduced moisture or water dilution in the food items by about 60 percent as compared to known methods of treatment where the steam is projected downwardly into direct contact with the food items.

I claim:

1. In a cooker device comprising, a cabinet, at least one compartment disposed in said cabinet, a plurality of vertically spaced, support members disposed in said compartment adapted for supporting containers thereon, and fluid transmitting line means disposed below and adjacent the opposed ends of each of said support members adapted for delivering fluid under pressure upwardly toward said containers, a plurality of baffle members disposed in said compartment, certain of said baffle members being located between said support members and dividing said compartment into a plurality of superposed chambers, said fluid transmitting line means disposed within each of said chambers, wherein each of said baffle members includes a pair of oppositely disposed inclined top portions which extend divergently downwardly from one another, a generally vertically oriented side wall extending downwardly from each of said inclined top portions, and fastening means for mounting said baffle members in said compartment.

2. In a cooker device in accordance with claim 1, wherein said fluid transmitting line means include at least one pair of spaced, oppositely disposed tubes, each of said tubes having a series of longitudinally spaced apertures for emitting fluid under pressure therefrom.

3. In a cooker device in accordance with claim 2, wherein said apertures are disposed at a predetermined angle wtih respect to a horizontal plane passing through said compartment.

4. In a cooker device in accordance with claim 2, wherein each of said tubes is connected at one end to a source of fluid pressure, and plug means detachably connected to the other end of each of said tubes.

5. In a cooker device in accordance with claim 2, including a door means hingedly attached to said compartment and adapted for hermetically sealing said compartment, each of said tubes being adapted to be connected at one end to a source of fluid under pressure and at the other end adapted to receive a threaded closure means therein.

6. In a cooker device in accordance with claim 1, wherein said fastening means includes slot portions disposed in each of said side walls adapted for receiving projection means extending inwardly from the confronting side walls of said compartment.

7. In a cooker device in accordance with claim 1, wherein each of the side walls of the respective baffle members includes a flange portion adjacent the end thereof which extends inwardly therefrom and adapted for mounting said support members thereon.

8. In a cooker device in accordance with claim 1, wherein each of the side walls of said baffle members includes at least one tongue means adjacent the top and at least one tab means adjacent the bottom which extend outwardly therefrom adapted for engagement with the confronting interior surfaces of said compartment.

9. In a cooker device comprising, a cabinet, at least one compartment disposed in said cabinet, a plurality of vertically spaced, open-work support members disposed in said compartment adapted for supporting containers thereon, fluid transmitting line means disposed below and outwardly adjacent the opposed ends of each of said support members adapted for delivering fluid under pressure upwardly toward said containers, a plurality of vertically spaced baffle members disposed in said compartment and dividing said compartment into a plurality of vertically spaced chambers, each of said chambers including one of said support members, said fluid transmitting line means including at least one pair of oppositely disposed, laterally spaced tubes mounted in each of said chambers, each pair of said tubes being disposed below and outwardly adjacent the opposed ends of the respective support members and oriented in generally vertical alignment with one another, each of said tubes having a series of longitudinally spaced apertures for emitting fluid under pressure therefrom, and each of said apertures being disposed at a predetermined angle with respect to a horizontal plane passing through the respective of said chambers for directing said fluid angularly upwardly for direct impingement upon the confronting undersurface of containers mounted on a respective of said support members to provide a turbulent fluid flow on and around the containers mounted in each of said chambers.

10. In a cooker device in accordance with claim 9, wherein said baffle members each include a pair of oppositely disposed inclined top portions which extends divergently downwardly away from one another, and the respective inclined top portions of each of said baffle members extending generally parallel to one another.

11. In a cooker device in accordance with claim 10, wherein the angle of inclination of the apertures in said tubes corresponds generally to the angle of inclination of the top portions of the respective of said baffle members.

12. In a cooker device in accordance with claim 9, wherein the angle of inclination of the apertures in said tubes is between about 10° to 15°.

13. In a cooker device in accordance with claim 9, wherein the tubes in each of said chambers are disposed in substantially vertical alignment with one another adjacent the side walls of said cabinet with each pair of tubes being disposed intermediate said baffle members, and the vertical distance between respective of said tubes being generally equal to the corresponding distance between respective of said baffle members.

14. In a cooker device in accordance with claim 9, wherein said tubes are disposed in two vertically spaced rows disposed adjacent the side walls of said cabinet, and a common supply pipe communicating with each of said rows for connecting said tubes to a source of fluid pressure.

References Cited

UNITED STATES PATENTS

| | | | |
|---|---|---|---|
| 3,030,486 | 4/1962 | Lashley | 99—234 |
| 3,063,464 | 11/1962 | Binding | 126—369.2 |
| 3,071,473 | 1/1963 | Churley | 99—100 |

ROBERT W. JENKINS, Primary Examiner